US009218390B2

(12) United States Patent
Feng et al.

(10) Patent No.: US 9,218,390 B2
(45) Date of Patent: Dec. 22, 2015

(54) QUERY PARSER DERIVATION COMPUTING DEVICE AND METHOD FOR MAKING A QUERY PARSER FOR PARSING UNSTRUCTURED SEARCH QUERIES

(75) Inventors: Donghui Feng, Fremont, CA (US); Kirk Boydston, Amsterdam (NL); Nathaniel A. Murray, Valencia, CA (US); Clarke Retzer, Van Nuys, CA (US); James G. Shanahan, San Francisco, CA (US); Remi Zajac, Pasadena, CA (US)

(73) Assignee: YELLOWPAGES.COM LLC, Tucker, GA (US)

( * ) Notice: Subject to any disclaimer, the term of this patent is extended or adjusted under 35 U.S.C. 154(b) by 411 days.

(21) Appl. No.: 13/194,887

(22) Filed: Jul. 29, 2011

(65) Prior Publication Data

US 2013/0031113 A1    Jan. 31, 2013

(51) Int. Cl.
*G06F 7/00* (2006.01)
*G06F 17/30* (2006.01)

(52) U.S. Cl.
CPC ...... *G06F 17/30401* (2013.01); *G06F 17/3087* (2013.01)

(58) Field of Classification Search
CPC .................. G06F 17/3087; G06F 17/3064
USPC .......... 707/708, 755, 760, 771, 811, E17.014, 707/919, 999.003, 999.004, 759, 774
See application file for complete search history.

(56) References Cited

U.S. PATENT DOCUMENTS

| | | | |
|---|---|---|---|
| 7,146,361 B2 | 12/2006 | Broder | |
| 7,512,602 B2 | 3/2009 | Broder | |
| 7,634,467 B2 | 12/2009 | Ryan | |
| 8,601,015 B1 * | 12/2013 | Wolfram et al. | 707/759 |
| 2004/0243568 A1 | 12/2004 | Wang et al. | |
| 2008/0104542 A1 | 5/2008 | Cohen | |
| 2008/0195600 A1 | 8/2008 | Deakter | |
| 2009/0119257 A1 | 5/2009 | Waters | |
| 2009/0222441 A1 | 9/2009 | Broder | |
| 2011/0082887 A1 | 4/2011 | Friedlander | |
| 2011/0184981 A1 * | 7/2011 | Lu et al. | 707/774 |

OTHER PUBLICATIONS

Yunyao Li, Huahai Yang, and H.V. Jagadish; "Consturcting a Generic Natural Language Interface for an XML Database"; 2006.*

(Continued)

*Primary Examiner* — James Trujillo
*Assistant Examiner* — John J Morris
(74) *Attorney, Agent, or Firm* — Alston & Bird LLP (57) ABSTRACT

A system and method is provided which may comprise parsing an unstructured geographic web-search query into a field-based format, by utilizing conditional random fields, learned by semi-supervised automated learning, to parse structured information from the unstructured geographic web-search query. The system and method may also comprise establishing semi-supervised conditional random fields utilizing one of a rule-based finite state machine model and a statistics-based conditional random field model. Systematic geographic parsing may be used with the one of the rule-based finite state machine model and the statistics-based conditional random field model. Parsing an unstructured local geographical web-based query in local domain may be done by applying a learned model parser to the query, using at least one class-based query log from a form-based query system. The learned model parser may comprise at least one class-level n-gram language model-based feature harvested from a structured query log.

18 Claims, 5 Drawing Sheets

(56) References Cited

OTHER PUBLICATIONS

Gildea, et al., "Automatic labeling of semantic roles," Computational Linguistics, 28(3):245-288 (2002).
Pradhan, et al., "Semantic Role Parsing: Adding Semantic Structure to Unstructured Text," Proceedings of International Conference of Data Mining (2003).
Martins, et al., "Handling locations in search engine queries," Proceedings of Geographic Information Retrieval (2006).
Guillén, "GeoCLEF2007 Experiments in query parsing and cross language GIR," Working Notes of CLEF (2007).
Baker, et al., "The Berkeley FrameNet Project," Proceedings of the 17th International Conference on Computational Linguistics, 1, p. 86-90 (1998).
Kingsbury et al., "Adding semantic annotation to the penn treebank," Proceedings of Human Language Techonology (2002).
Feng, et al., "Semantics-oriented language understanding with automatic adaptability," Proceedings of Natural Language Processing and Knowledge Engineering (2003).
Bhagat et al., "Shallow semantic parsing despite little training data," Proceedings of the ACL/SIGPARSE 9th International Workshop on Parsing Technologies (2005).
Trigoni, "Interactive query formulation in semi-structured databases," Proceedings of the International Conference on Flexible Query Answering Systems (2002).
Chen, et al., "Online query refinement on information retrieval systems: a process model of searcher/system interactions," Proceedings of Special Interest Group on Information Retrieval (1990), pp. 115-133.
Hofstede, et al. "Query formulation as an information retrieval problem," The Computer Journal, 39(4):255-274 (1996).
Küpper et al., "NAUDA: A cooperative natural language interface to relational databases," SIGMOD Record, 22(2):529-533 (1993).
Androutsopoulos et al., "Natural language interfaces to databases—an introduction," Journal of Language Engineering, 1(1):29-81 (1995).
Popescu et al., "Modern natural language interfaces to databases: Composing statistical parsing with semantic tractability," Proceedings of the Twentieth International Conference on Computational Linguistics (2004).
Li et al., "NaLIX: an interactive natural language interface for querying XML," Proceedings of the Special Interest Group on Management of Data (2005) pp. 900-902.
Delden, et al., "Retrieving NASA problem reports: a case study in natural language information retrieval," Data & Knowledge Engineering, 48(2):231-246 (2004).
Chu-Carroll et al. "A hybrid approach to natural language Web search," Proceedings of the Conference on Empirical Methods in Natural Language Processing (2002), pp. 180-187.
GeoCLEF, "Evaluation of multilingual Geographic Information Retrieval (GIR) systems" available at: http://www.uni-hildesheim.de/geoclef/.
Jones, et al., "Geographic intention and modification in web search," International Journal of Geographical Information Science, vol. 22, p. 229-246 (2008).
Gan, et al., "Analysis of geographic queries in a search engine log," Proceedings of the First international Workshop on Location and the Web (2008).
Manshadi, et al., "Semantic tagging of web search queries," Proceedings of the Joint Conference of the 47th Annual Meeting of the ACL and the 4th International Joint Conference on Natural Language Processing of the AFNLP (2009).
Li, et al., "Extracting structured information from user queries with semi-supervised conditional random fields," Proc. of SIGIR (2009).
Lafferty, et al., "Conditional random fields: probabilistic models for segmenting and labeling sequence data," Proceedings of the 18th International Conference on Machine Learning (2001) pp. 282-289.
Beitzel, Steven M. et al, "Improving Automatic Query Classification via Semi-supervised Learning," 2005, Fifth IEEE International Conference on Data Mining, 8 pgs.
Luo, Qiong et al., "Form-Based Proxy Caching for Database-Backed Web Sites," 2000, 10 pgs.
Jones, Rosie et al., "Generating Query Substitutions," Proceedings of the 15th international conference on World Wide Web, 2006, 10 pgs.
Lafferty, John et al., "Conditional Random Fields: Probabilistic Models for Segmenting and Labeling Sequence Data," 2001, 8 pgs.

\* cited by examiner

```
<START> = <TopicEx> | <GeoEx>;
<TopicEx> = <<ngrams-from-SearchTerm-log>> |
            <<business-category-list>>;
<GeoEx> = [ <GeoRel> ] <Geo>;
<GeoRel> = <<prep-list>>;
<Geo> = ( [ <<city-list>> ] [ <<state-list>> ] ) |
<<ngrams-from-Geo-log>> | <<zip-code-list>>;
```

QUERY PARSER DERIVATION COMPUTING DEVICE AND METHOD FOR MAKING A QUERY PARSER FOR PARSING UNSTRUCTURED SEARCH QUERIES

FIELD

The present application relates to parsing unstructured web-based queries and particularly geographic queries for query formulation for general web searches and local web searches involving geographic search query terms.

BACKGROUND

Parsing unstructured local web queries is often tackled using simple syntactic rules that tend to be limited and brittle. Many search systems employ field-based query forms to support complex user needs and the underlying search algorithms are designed to utilize individual values in each field. Unstructured web queries therefore need to be parsed into field-based queries before being fed into the search systems. Semantic parsing in computational linguistics aims to convert natural language sentences into semantic frames consisting of a list of name and value pairs, as is discussed in Gildea, et al., "Automatic Labeling of Semantic Roles," Computational Linguistics, 28(3):245-288 (2002) ("Gildea") and Pradhan, et al., "Semantic Role Parsing: Adding Semantic Structure to Unstructured Text," Proc. of ICDM (2003) ("Pradhan"). However, most approaches, if adopted for query parsing, require query level grammars or labeled data that are not always available.

For example, for field-based search systems usually do not have labeled unstructured queries. In addition, it requires nontrivial work for re-iterating over previous labeled data to support additional semantic classes. In practice, more often people have a large amount of logs for particular form fields or semantic classes. For example, one might want to extract search terms and geographic locations from web queries, but there is no such data set available without nontrivial work to do categorization and human labeling. Instead, most local search web sites have query logs for each semantic class (e.g., yellowpages.com and citysearch.com) or others, e.g., Local Search Engines like Yahoo!, Local Search and Social Local Sites like Yelp.com or Qype. A major challenge relates to building robust parsers while using field-based logs to overcome the data problem of lacking of query level grammars/labels.

Geographic queries consist of a large portion of general web queries. Although correctly parsing geographic queries is useful for query formulation in both general web search and local search, most of previous work, such as is discussed in Martins, et al., "Handling Locations in Search Engine Queries," Proc. of GIR (2006) ("Martins") and Guillen, "Geo-CLEF2007 Experiments in Query Parsing and Cross Language GIR," Working Notes of CLEF (2007) ("Guillen") has used simple syntactic rules that tend to be limited and brittle.

Web search queries using natural language present problems for both natural language processing ("NLP") and information retrieval ("IR"). Natural language researchers have developed various semantic parsers including as discussed in Gildea and Pradhan noted above, as more semantic resources such as FrameNet and PropBank have become available, as discussed, respectively in Baker, et al., "The Berkeley FrameNet Project," Proc. of COLING/ACL (1998) and Kingsbury, e. al., "Adding Semantic Annotation to the Penn Treebank," Proc. of HLT (2002). Most semantic parsers focus on general domains or dialogue systems, such as are discussed, respectively in Feng, et al., "Semantics-Oriented Language Understanding with Automatic Adaptability," Proc. of NLP-KE (2003) and Bhagat, et al., "Shallow Semantic Parsing Despite Little Training Data," Proc. of IWPT (2005).

However, such cannot be directly applied to geographical web queries. Most IR research on query formulation has focused on developing interactive interfaces to facilitate query formulation, as discussed in Trigoni, "Interactive Query Formulation in Semi-Structured Databases," Proc. of FQAS (2002), or strategies helping refine queries, such as is discussed in Chen, et al., "Online Query Refinement on Information Retrieval Systems: A Process Model of Searcher/System Interactions," Proc. of SIGIR (1990) and Hofstede, et al. "Query Formulation as an Information Retrieval Problem," The Computer Journal, 39(4):255-274 (1996).

From the perspective of application, natural language queries/questions have been mainly used as interfaces for database systems, as discussed in Kupper et al., "NAUDA: A Cooperative Natural Language Interface to Relational Databases," SIGMOD Record, 22(2):529-533 (1993), Androutsopoulos et al., "Natural Language Interfaces to Databases—An Introduction," Journal of Language Engineering, 1(1):29-81 (1995), Popescu et al., "Modern Natural Language Interfaces to Databases: Composing Statistical Parsing with Semantic Tractability," Proc. of COLING (2004), Li et al., "NaLIX: An Interactive Natural Language Interface for Querying XML," Proc. of SIGMOD (2005), and Delden, et al., "Retrieving NASA Problem Reports: A Case Study in Natural Language Information Retrieval," Data & Knowledge Engineering, 48(2):231-246 (2004) or for automatic question answering systems, as discussed in Chu-Carroll et al. "A Hybrid Approach to Natural Language Web Search," Proc. of EMNLP (2002).

Recently geographical query parsing, especially with the high demand of mobile search, has resulted in the development of the geographic query parsing track in GeoCLEF. Most of the reported work concentrates on pattern analysis using simple syntactic rules, as is discussed in Gravano, et al., "Categorizing Web Queries According to Geographical Locality," Proc. of CIKM (2003), Jones, et al., "Geographic Intention and Modification in Web Search," International Journal of Geographical Information Science (IJGIS), Vol. 22, p.229-246 (2008), Gan, et al., "Analysis of Geographic Queries in a Search Engine Log," Proc. Of the First international Workshop on Location and the Web (2008), and Martins and Guillen. Semantic tagging of web queries as discussed in Manshadi, et al., "Semantic Tagging of Web Search Queries," Proc. of ACL-IJCNLP (2009) and Li, et al., "Extracting Structured Information from User Queries with Semi-Supervised Conditional Random Fields," Proc. of SIGIR (2009) most closely relates to the disclosed subject matter of the present application.

A so-called local search can involve specialized Internet search engines that allow users to submit geographically constrained searches, usually against a structured database of local business listings. Typical local search queries include not only information about "what" the site visitor is searching for (such as keywords, a business category, or the name of a consumer product) but also "where" information, such as a street address, city name, postal code, or geographic coordinates like latitude and longitude. Examples of local searches include "Hong Kong hotels", "Manhattan restaurants", and "Dublin Hertz."

As discussed in Lafferty, et al., "Conditional Random Fields: Probabilistic Models for Segmenting and Labeling Sequence Data," Proc. ICML (2001), conditional random fields can be used as a framework for building probabilistic models to segment and label sequence data, offering advantages over hidden Markov models and stochastic grammars which have been used in linguistics for a wide variety of problems in text and speech processing, including topic segmentation, part-of speech (POS) tagging, information extraction, and syntactic disambiguation, such as is discussed in Manning, et al., Foundations of Statistical Natural Language Processing," Cambridge Mass.: MIT Press (1999).

Conditional random fields can relax strong independence assumptions made in those models, and also avoid limitations of maximum entropy Markov models ("MEMMs") and other discriminative Markov models based on directed graphical models, which can, e.g., be biased towards states having few successor states. Hidden Markov models ("HMMs") and stochastic grammars, generative models, e.g., assigning a joint probability to paired observation and label sequences, and typically trained to maximize the joint likelihood of training examples, require an impractical representation of multiple interacting features or long-range dependencies of the observations, since the model inference problem is intractable.

Maximum entropy Markov models ("MEMMs") are conditional probabilistic sequence models that also attain all of the above noted advantages, as discussed in McCallum, et al., "Maximum entropy Markov models for information extraction and segmentation," Proc. ICML 2000 (pp. 591-598), Stanford, Calif. (2000). However, MEMMs and other non-generative finite-state models based on next-state classifiers, such as discriminative Markov models, discussed in Bottou, L., "Une Approche Theorique de L'apprentissage Connexionniste: Applications a la Reconnaissance de la Parole," Doctoral Dissertation, Universite de Paris XI (1991), suffer from a label bias problem, a so-called "conservation of score mass," as stated by Bottou, which biases toward states with fewer outgoing transitions.

BRIEF DESCRIPTION OF THE DRAWINGS

For a more complete understanding of the present invention, reference is made to the following detailed description of exemplary embodiments considered in conjunction with the accompanying drawings, in which.

DETAILED DESCRIPTION OF THE EXEMPLARY EMBODIMENTS

The disclosed subject matter of the present application relates to a data-driven approach to learning/deriving a query parser for local-search (geographical) unstructured queries. The learned model can use class-level multi-gram language model-based features. Such features of multi-gram language models, harvested from tokens contained in a structured queries log, can insulate the model from surface-level tokens. As used herein a feature of a multi-gram language model contains features of n tokens (words/symbols) in length, where n is an integer, and can be defined as GEO_UNI_FIRST, for the first word/symbol in a feature of a multi-gram of length 1 (i.e., a "UNI-gram") relating to a geographic ("GEO") term, GEO_BI_FIRST, for the first word/symbol in a multi-gram of length two ("BI") relating to a geographic ("GEO") term, GEO_BI_SECOND, for the second words/symbol in a multi-gram of length two ("BI") relating to a geographic ("GEO") term, GEO_TRI_FIRST, for the first word/symbol in a multi-gram of length three ("TRI") relating to a geographic term ("GEO"), GEO_TRI_SECOND, for the second word/symbol in a multi-gram of length three ("TRI") relating to a geographic term ("GEO"), GEO_TRI_THIRD, for the third word/symbol in a multi-gram of length three ("TRI") relating to a geographic term, and similar data definitions, ST_UNI_FIRST, ST_BI_FIRST, ST_BI_SECOND, ST_TRI_FIRST, ST_TRI_SECOND and ST_TRI_THIRD, relating to search terms, and so forth, for any integer n, though usually not more than about four ("QUA") or five ("PEN").

A major challenge presented by the art, which applicants have addressed in the present application, is how to build robust parsers while using field-based logs to overcome the data problem due to lacking query level grammars/labels. A data driven paradigm, utilized in a query parser derivation computing device, according to aspects of an embodiment of the disclosed subject matter, addresses the problem in the contradictory direction, from field-based queries to unstructured queries.

Building on correctly parsing geographic queries, used for query formulation in both general web search and local search, the presently disclosed query parser derivation computing device avoids the problems in the art that has used simple syntactic rules that tend to be limited and brittle. The disclosed subject matter applies a data-driven approach to learning (deriving) a query parser, e.g., for local-search (geographical) queries.

According to aspects of an embodiment of the disclosed subject matter, utilized in a query parser derivation computing device, a data-driven approach is built using conditional random field ("CRF") models. Class transition features, utilized in a query parser derivation computing device, can be learned by the query parser derivation computing device, from a labeled set and high-level language models extracted in a novel way for use as state features. By doing this, applicants propose learning of language models, utilizing the query parser derivation computing device, from large-scale class-based logs to obtain high coverage on unknown queries. As compared with other earlier used approaches including a finite state model based parser, applicants have experimented and determined that significant improvements can be seen for parsing geographical web queries, utilizing a query parser derivation computing device, to construct the proposed learned models.

The query parser derivation computing device, according to aspects of the disclosed subject matter is beneficial in that the disclosed subject matter provides for the derivation of a robust and flexible query parser for parsing, e.g., unstructured local search queries including geographic query elements. A data driven approach, utilized in a query parser derivation computing device, can easily be extended to support more semantic labels and adapted to other types of applications provided with similar data sources. In addition, the disclosed subject matter, utilized in a query parser derivation computing device, leverages as features high-level class-based language models. Also provided is a solution for utilizing large-scale legacy data (class/label-based query logs), saving expensive human labeling efforts.

In regard to the disclosed statistical parser, according to aspects of the disclosed subject matter, utilizing a query parser derivation/computing device, state transition features are learned from a small labeled set and high-level multi-gram language models are extracted to generalize the derived parser and improve its coverage. This removes the bottleneck in most semi-automatic supervised learning problems, i.e., that of the acquisition of labeled data. The query parser derivation computing device, according to aspects of the disclosed subject matter, provides a work through of the data problem by the derived parser taking advantage of leveraging large scale but noisy class-based query logs.

Applicants propose a data driven paradigm, utilized in a query parser derivation computing device, to address the problems in the art noted above in a contradictory direction, i.e., from field-based queries to unstructured queries. Applicants propose to address the problems in the art noted above with a query parser derivation computing device using a rule-based approach using a finite state machine ("FSM") and a statistical approach using a statistical sequential labeling model, such as a conditional random field ("CRF") model. For the FSM approach, phrase level grammars are used and grammar composition is applied by a query parser derivation computing device, to build a large-scale query parser. For the CRF based parser, the query parser derivation computing device, learns class transition features from a labeled set and extracts high-level language models as state features, which allows for learned language models learned from large-scale class-based logs to provide high coverage on unknown queries.

Utilizing a query parser derivation computing device a parser for parsing unstructured geographical web queries in local domain is provided, which uses class-based logs from form-filling based search systems. Systematic derivation, e.g., using a geographic query parser for both rule-based and statistical approaches allows for derivation on a query parser derivation computing device utilizing class-based logs and a system and process that learns transition feature functions and class-based high-level language models to be injected into a CRF model. A small labeled query set is used to improve coverage. Applicants propose parsing schema and methodology for deriving a finite state machine based parser and the CRF based parser.

With regard to query representation for a geographic query one needs to recognize both a geographic location and a search term. Table 1 gives a geographic query schema definition.

TABLE 1

| Field | Description | Example |
| --- | --- | --- |
| SearchEx | the original query | find the best bar in Los Angeles, CA |
| TopicEx | search terms | the best bar |
| GeoEx | geo expression | in Los Angeles, CA |
| GeoRel | Relation indication for GeoEx | in |
| O | Uninteresting information | Find |

As an example, turning to Table 1, from an original query "find the best bar in Los Angeles, Calif.", "Los Angeles, Calif." is extracted as the geographic expression ("GeoEx"), "in" is extracted as a geographic relation indication for "GeoEx" ("GeoRel") and "the best bar" is extracted as a search term ("TopicEx"). An actual query in the data set may not contain all information, e.g., only TopicEx and GeoEx may be present. Context free grammar ("CFG") composition, according to aspects of an embodiment of the presently disclosed subject matter, can then be used by the query parser derivation computing device to build a finite state machine ("FSM") parser.

Based on analysis of geographic web queries, each piece of information can be represented by the query parser derivation computing device at the phrase level. For example, both the search term. TopicEx "the best bar" and the geographic term GeoEx "Los Angeles, Calif." are phrases. Grammars are designed and used by the query parser derivative computing device at the phrase level and a context free grammar ("CFG") composition can be used by the query parser derivation computing device to cover all variations.

Figure 1:
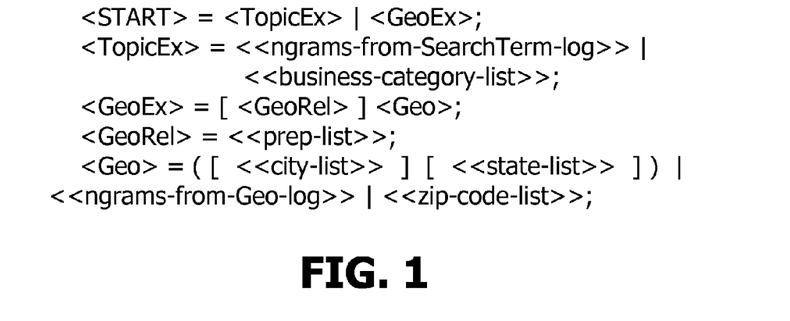
FIG. 1 shows a snippet of proposed grammars and a context-free grammar ("CFG") composition that can be completed for use in a query parser derivation computing device, e.g., using the AT&T Watson toolkit.

Turning to FIG. 1 there is shown a snippet of proposed grammars and the CFG composition that can be completed, e.g., using the AT&T Watson toolkit, as is discussed in Mohri, et al., "The Design Principles of a Weighted Finite-State Transducer Library," Theoretical Computer Science, 231, 17-32 (2000). A conditional random field ("CRF") model is used by the query parser derivation computing device to specify the probabilities of possible label sequences given an observation sequence, and, therefore, not expend modeling effort on the observations.

The label sequence can depend on arbitrary, non-independent features of the observation sequence without forcing the model utilized by the query parser derivation computing device to account for the distribution of those dependencies. The chosen features may represent attributes at different levels of granularity of the same observations (for example, words and characters in English text), or aggregate properties of the observation sequence (for instance, text layout).

The probability of a transition between labels can depend not only on the current observation, but also on past and future observations, if available. In contrast, generative models make very strict independence assumptions on the observations, for instance conditional independence given the labels, to achieve tractability.

Conditional random fields (CRFs), is a sequence modeling framework that has all the advantages of MEMMs but also can be utilized by the query parser derivation computing device to solve the label bias problem in a principled way. A CRF has a single exponential model for the joint probability of the entire sequence of labels given the observation sequence. The query parser derivation computing device can trade off the weights of different features at different states against each other.

A CRF as a finite state model with un-normalized transition probabilities. However, unlike some other weighted finite-state approaches, e.g., as discussed in LeCun, et al., "Gradient-based learning applied to document recognition," Proceedings of the IEEE, 86, 2278-2324 (1998), CRFs can be utilized by the query parser derivation computing device to assign a well-defined probability distribution over possible labelings, which can also be trained by maximum likelihood or maximum A-posteriori ("MAP") estimation such as:

$$\hat{m} = \underset{m_i}{\mathrm{argmax}}\ P(m_i | r_j)$$

for a discrete channel, e.g., where an output R gets one of the values {rj} according to this maximum A-posteriori decision rule. Furthermore, the loss function is convex, guaranteeing convergence by the query parser derivation computing device to the global optimum. CRFs also can be utilized by the query parser derivation computing device to generalize easily to analogues of stochastic context-free grammars that can be useful in such problems as natural language processing.

As shown in FIG. 1, topics can be composed of n-gram language models learned by the query parser derivation computing device from a search term query log and a business category list, such as may be available when the query parser derivation computing device is searching in, e.g., a directory of subscribers to an on-line telephone directory such as 411.com and the like. Geo expressions (GeoEx) can be composed of n-gram language models extracted by the query parser derivation computing device from geographic query logs, city, state, and zip code lists, etc.

Although an FSM parser can capture a large portion of the geographic queries, it is not very flexible and robust to parse queries that are even slightly different from originally defined rules. In addition, FSM parsers may produce a list of candidates and it may be hard to choose the correct one from among those listed. A solution has be found by applicants in the use by a query parser derivation computing device of a learning statistical parser using CRF models, such as are discussed in Lafferty.

Due to the flexibility of potential user queries, strict rule-based FSM parsing cannot handle cases where only fragments can be identified. In such a case, statistical approaches are useful, by a query parser derivation computing device according to aspects of an embodiment of the disclosed subject matter, where query parsing can be viewed by the query parser derivation computing device, e.g., as a sequential labeling problem.

For most language processing tasks, a CRF model can be treated by a query parser derivation computing device as a linear-chain Markov Random Fields model. Each input query $Q=(t1, t2 \ldots, tn)$ can be processed by a query parser derivation computing device as a sequence of individual tokens, with a corresponding labeling sequence of labels, $L=(l1, l2 \ldots, ln)$, so that each token corresponds to one label. Labels can be defined, such as, being sentences as defined above, e.g. "TopicEx", "GeoEx", "GeoRel", and "O", as shown in Table 1 corresponding to the labels listed in Table 1.

Given an input query Q, the most probable labeling sequence L can be found by the query parser derivation computing device. A maximum A-posteriori decision rule for this procedure can be $$L = \underset{L}{\mathrm{argmax}} P(L|Q).$$

A CRF model of the two sequences can be utilized by the query parser derivation computing device characterized by a set of feature functions fk and their corresponding weights λk. As in Markov fields, the conditional probability $P(L|Q)$ can be computed by the query parser derivation computing device using the following Equation:

$$P(L|Q) = \frac{1}{Z_S} \exp\left(\sum_{t=1}^{T} \sum_k \lambda_k * f_k(l_{t-1}, l_t, Q, t)\right)$$

where $f_k(l_{t-1}, l_t, Q, t)$ is a feature function, representing either a state transition feature, such as, $f_k(l_{t-1}, l_t, Q)$ or a feature of an output state, such as, $f_k(l_t, Q)$ given an input sequence. The query parser derivation computing device can be utilized to form a parser that is trained, e.g., on a small labeled set. This can be useful to learn, e.g., the state transition feature $f_k(l_{t-1}, l_t, Q, t)$ limited on learning features of the output state $f_k(l_t, Q)$. That can impair the coverage of such a learned parser, e.g., when generalized to other larger data sets, to address which high-level language model features can be utilized by the query parser derivation computing device.

For this task applicants have explored five categories of features for a CRF parser which can be utilized by a query parser derivation computing device. As shown in Table 2, the query parser derivation computing device can extract a surface word and a window word as features. The query parser derivation computing device can also learn uni-, bi-, and tri-gram language models, i.e., n-gram models, where n is 1, 2 and 3, i.e., UNIGRAM, BIGRAM, TRIGRAM, from class-based logs. High-level class-based language model features can be defined instead of using language model tokens. For example, for the current token, if it appears as the ith word, such as the first word, in an n-gram of a given length, such as a bigram (length two) learned from geographic terms, it would be assigned by the query parser derivation computing device a feature definition, i.e., GEO_NTH_ITH, i.e., GEO_BI_FIRST. If it appears as the second word in a bigram learned from search terms, it would be assigned a feature ST_NTH_ITH, i.e., ST_BI_SECOND by the query parser derivation computing device, and so-forth as indicated in Table 2 and as discussed above. The features can serve for the query parser derivation computing device as high-level language model features for the parsing and also help improve system coverage.

TABLE 2

| Feature | Description |
| --- | --- |
| prev-word | previous word |
| next-word | next word |
| surface word | current word |
| ST_UNI | class-based language |
| ST_BI_FIRST | model features for |
| ST_BI_SECOND | search terms |
| ST_TRI_FIRST | |
| ST_TRI_SECOND | |
| ST_TRI_THIRD | |

TABLE 2-continued

| Feature | Description |
| --- | --- |
| GEO_UNI<br>GEO_BI_FIRST<br>GEO_BI_SECOND<br>GEO_TRI_FIRST<br>GEO_TRI_SECOND<br>GEO_TRI_THIRD | class-based language<br>model features for geo<br>terms |

Figure 2:
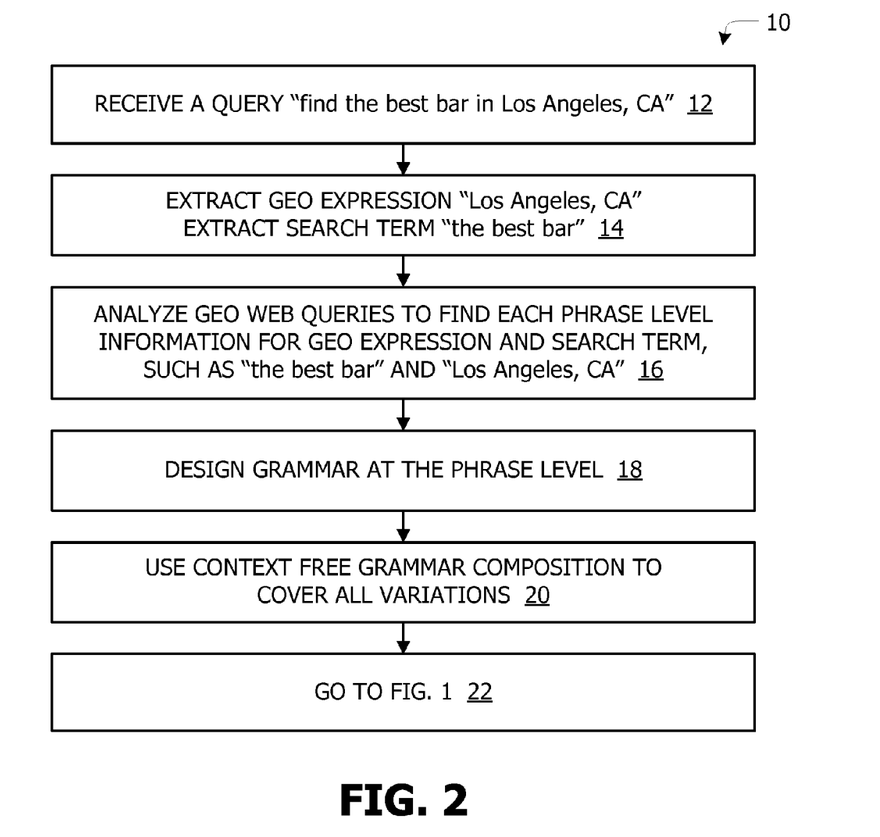
FIG. 2 illustrates in block diagram format a process that can be used by a query parser derivation computing device for processing an input search query using a conditional random field ("CRF") model according to aspects of an embodiment of the disclosed subject matter.

Turning now to FIG. 2 a process 10 for the operation of a query parser is illustrated according to aspects of an embodiment of the disclosed subject matter, where in block 12 a query is received by the query parser. i.e., "find the best bar in Los Angeles, Calif." In the process step indicated by block 14 a query parser derivation computing device extracts a geo expression "Los Angeles, Calif." and extracts a search term "the best bar." In block 16 the query parser derivation computing device, analyzes geo web queries to find each phrase level information for the search term and the geo expression, such as "the best bar" and Los Angeles, Calif." From this, in block 18 the query parser derivation computing device can design a grammar at the phrase level, In block 20 the query parser derivation computing device can use context free grammar composition to cover all variations. In block 22 the query parser derivation computing device proceeds to the operations shown in FIG. 1.

Figure 3:
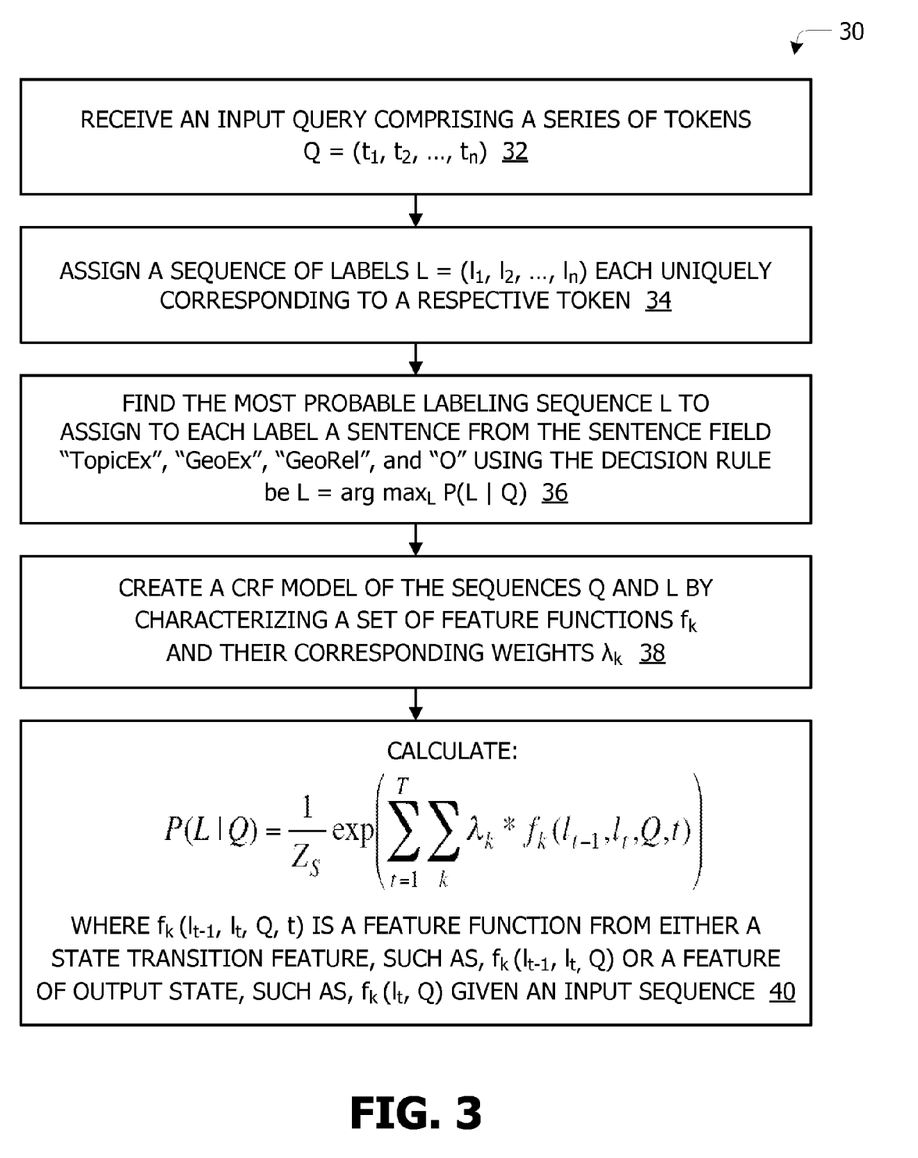
FIG. 3 illustrates in block diagram format a process that can be utilized by a query parser derivation computing device for creating a conditional random field ("CRF") model of query sequences Q and label sequences L according to aspects of an embodiment of the disclosed subject matter.

Turning to FIG. 3 a process 30 is illustrated according to aspects of an embodiment of the disclosed query parser derivation computing device, where in block 32 the query parser derivation computing device receives, e.g., over a communication network, such as the Internet, an input query comprising a sequence of tokens Q=(t1, t2, . . . , tn). In block 34, the query parser derivation computing device a sequence of labels L=(l1, l2 . . . , ln) each uniquely corresponding to a respective token. In block 36 the query parser derivation computing device finds the most probable labeling sequence L to assign each label a sentence from the sentence field comprising, e.g., search terms ("TopicEx"), geographic expression ("GeoEx"), geographic relation ("GeoRel"), and uninteresting term "O" using the decision rule L=arg max|P (L|Q), In block 38 the processor can create a CRF model of the sequences Q and L by characterizing a set of feature functions fk and their corresponding weights λk. In block 40 the query parser derivation computing device can calculate:

$$P(L|Q) = \frac{1}{Z_S} \exp\left(\sum_{t=1}^{T} \sum_{k} \lambda_k * f_k(l_{t-1}, l_t, Q, t)\right)$$

where $f_k(l_{t-1}, l_t, q, t)$ is a feature function from either a state transition feature, such as, $f_k(l_{t-1}, l_t, q)$ or a feature of output state, such as, $f_k(l_t, q)$ given an input sequence.

Figure 4:
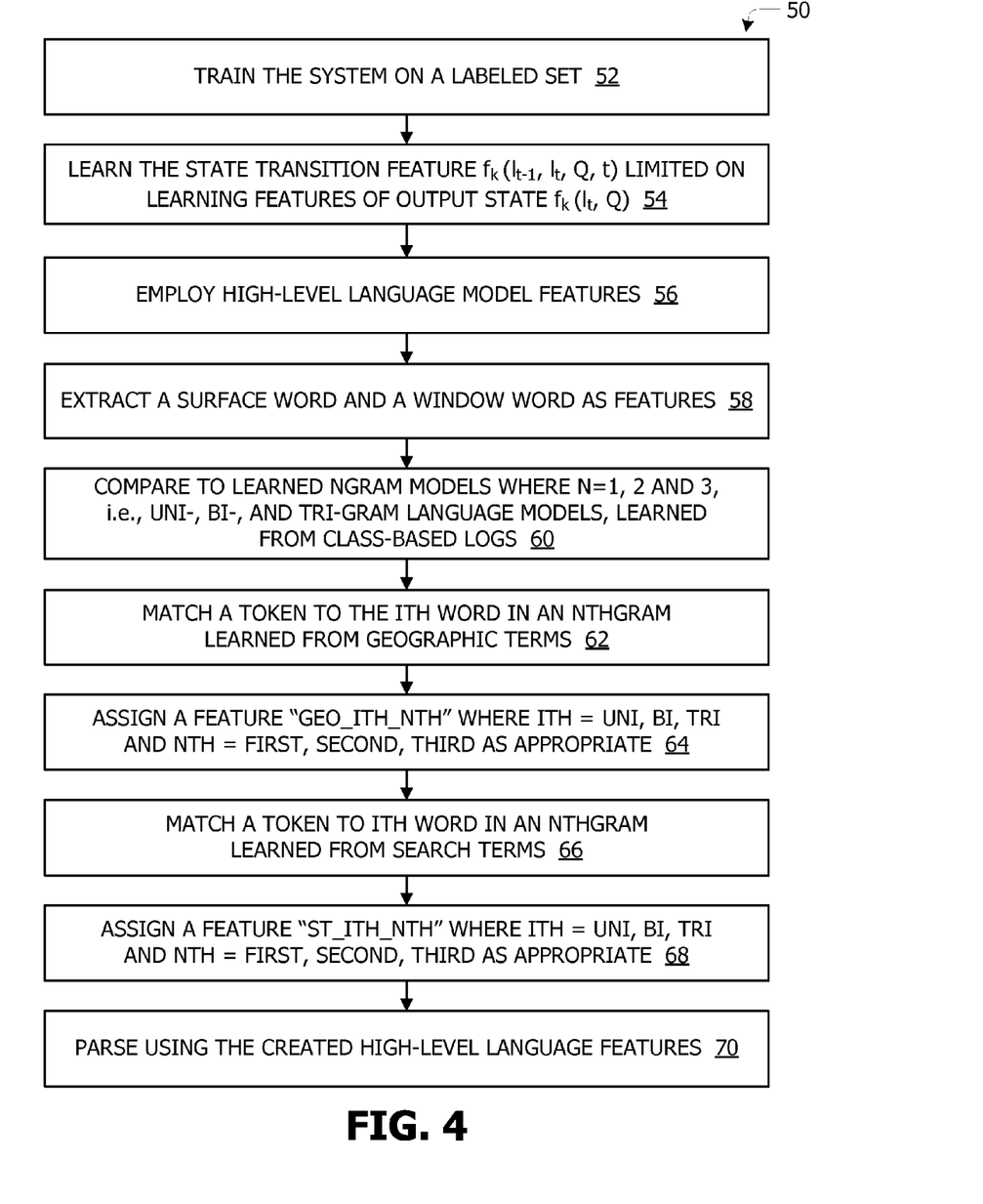
FIG. 4 illustrates in block diagram format a process that can be utilized by a query parser derivation computing device for creating a higher level language model according to aspects of an embodiment of the disclosed subject matter.

Turning to FIG. 4, a process 50 is illustrated where in block 52 the query parser derivation computing device, can train itself as a query parser derivation computing device based on a labeled set. In block 54, the query parser derivation computing device can learn the state transition feature fk (lt−1, lt, q, t) limited on learning features of the output state fk (lt, q). In block 56 the query parser derivation computing device can employ high-level language model features. In block 58, the query parser derivation computing device can extract a surface word and a window word as features.

In block 60, the query parser derivation computing device can compare to learned n-gram models where n=1, 2 and 3, i.e., uni-, bi-, and tri-gram language models, which can be learned from class-based logs. The query parser derivation computing device in block 62 can match a token to an ith word in an n-gram learned from geographic terms. In block 64 the processor can assign a feature "geo_ith_nth" where ith=uni, bi, tri and nth=first, second, third as appropriate, as discussed above. In block 66 the processor can match a token to the ith word in an nthgram learned from search terms. In block 68 the query parser derivation computing device can assign a feature "ST_ith_nth" where ith=uni, bi, tri and nth=first, second, third, as appropriate, as discussed above. Finally, the query parser derivation computing device in block 70 can create a parser that will utilize the created high level language features.

Figure 5:
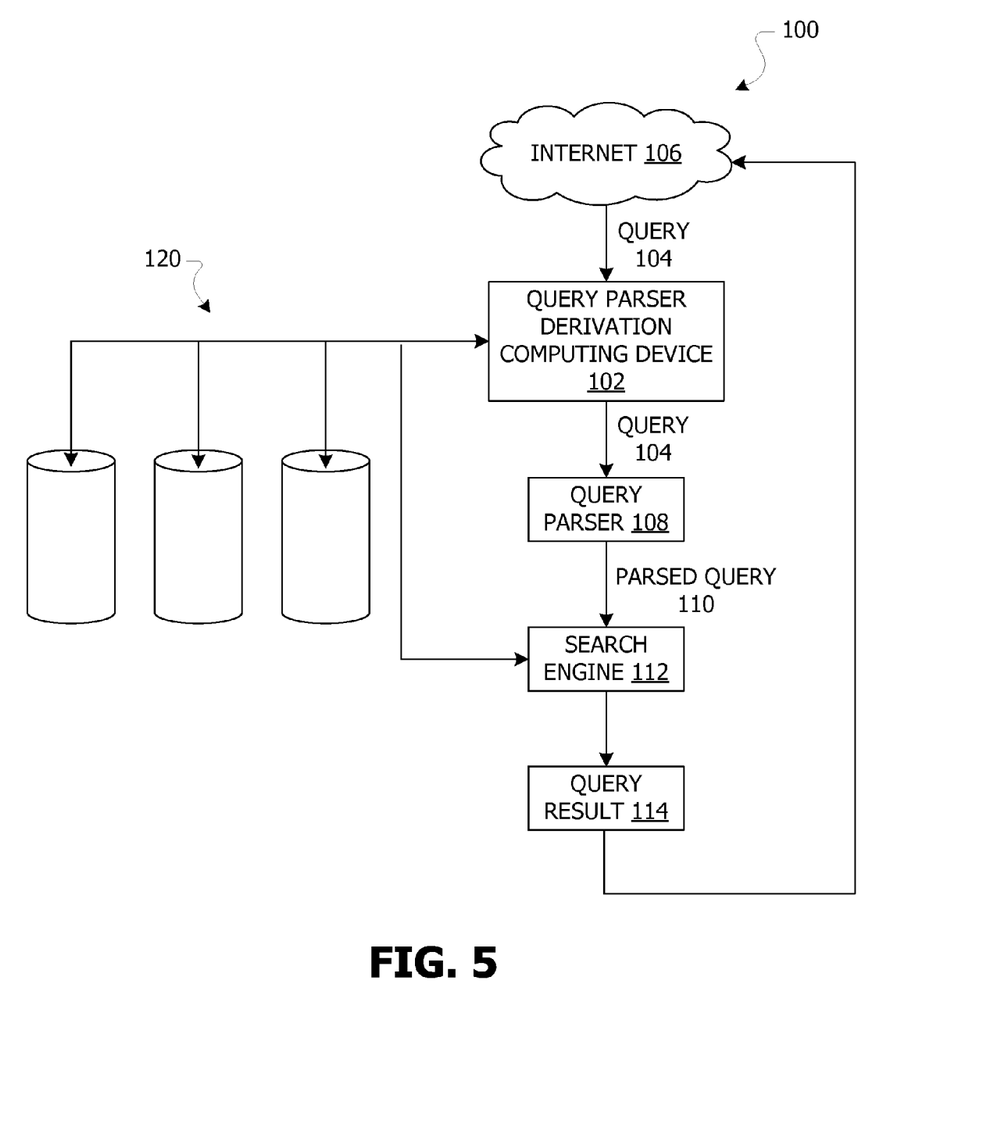
FIG. 5 illustrates in block diagram form a schematic representation of a query parser derivation computing device according to aspects of an embodiment of the disclosed subject matter.

Turning now to FIG. 5 there is shown in block diagram form a schematic representation of a query parser system 100 including a query parser derivation computing device 102 according to aspects of an embodiment of the disclosed subject matter. The query parser system 100 may receive a query 104, e.g., over the internet 106 and provide the query 104 to the query parser derivation computing device 102, which may derive a query parser 108, utilizing stored data, e.g., from databases 120, as discussed above. The system 100 may also provide the query 104 to the derived query parser 108, which can then provide the parsed query 110 to a search engine 112. the search engine may then used the parsed query to perform a search, e.g., in databases 120 to provide a query result 114, e.g., back through the internet 106 to the originator of the query 104.

Figure 6:
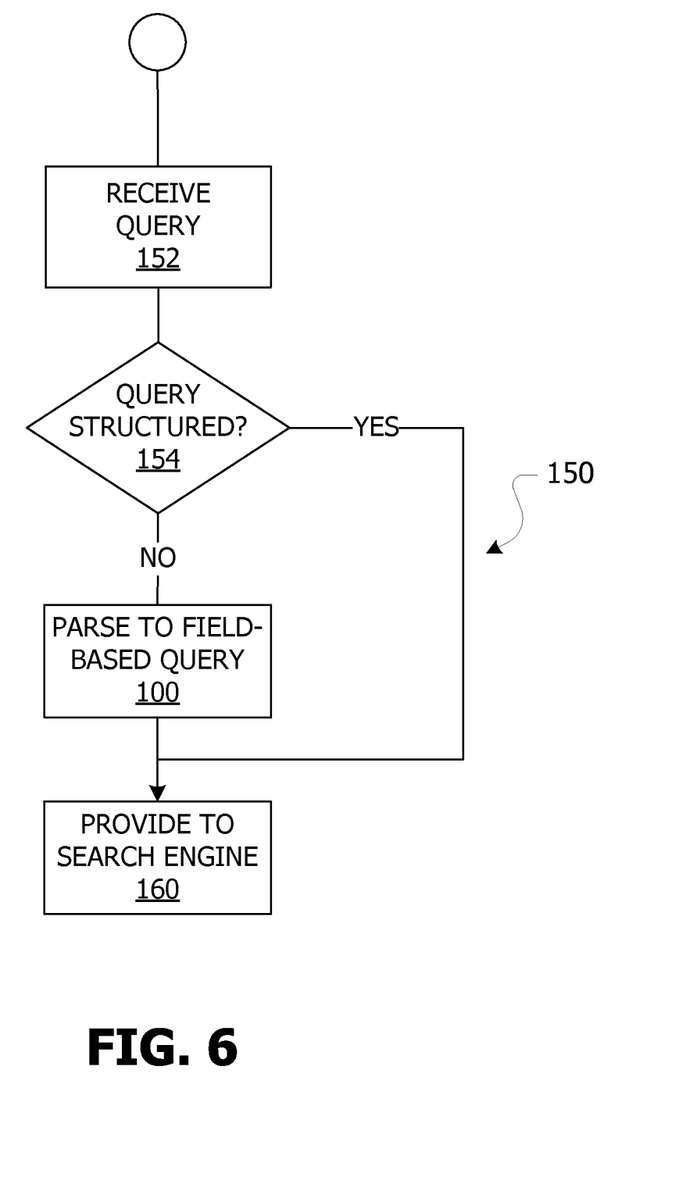
FIG. 6 illustrates in block diagram format an example of a query parser derivation process performed by the query parser derivation computing device of FIG. 5, according to aspects of an embodiment of the disclosed subject matter.

Turning now to FIG. 6 there is shown in block diagram format an example of a query parser derivation process 150 performed by the query parser derivation computing device 102 of FIG. 5, according to aspects of an embodiment of the disclosed subject matter. The process 150 may receive a query in block 152 and determine if the query is structured or unstructured in block 154. If the query is structured, the query may be delivered to a search engine in block 160. If the query is unstructured the query may be delivered to the system shown in FIG. 5, including the query parser derivation computing device 102 to produce a query parser and parse the query to a structured query, which can then be provided to the search engine in the step of block 160.

Of course it will be understood that the derivation of or generation of the query parser need not occur for each and every unstructured query that arrives at the system 100 of FIG. 54 or passes through the process 150 of FIG. 6. A suitable query parser derived according to aspects of embodiments of the disclosed subject matter may prove to be able to be used for similar types/structures of queries received subsequent to the derivation. In such case the derived query parser may be stored, e.g., in the databases 120, for reloading into the query parser 108 of FIG. 5 as appropriate.

Applicants have conducted experiments on two data sets, an AOL web query set and a synthetic query set, using evaluation metrics as discussed below. For geographical web query parsing, even partially correct parsing of queries may produce meaningful search results. Typical evaluation metrics were adopted from the prospective of information extraction, using precision, recall, and F1 at both the token and entity level.

$$\text{precision} = \frac{\text{\# of correct tokens}}{\text{\# of the extracted tokens by the system}}$$

$$\text{recall} = \frac{\text{\# of correct tokens}}{\text{\# of the tokens in the gold standard}}$$

-continued $$F1 = \frac{2*\text{precision}*\text{recall}}{\text{precision} + \text{recall}}$$

Such measures can be used to provide an indication of the completeness and correctness of parsing results utilizing the derived geographic local query parser created according to aspects of embodiments of the disclosed subject matter.

A processor downloaded an AOL web query data set and a classifier extracted geographical web queries. A pilot study on this classification task showed that there was very high agreement among human judges (averaging with an agreement of 0.92 and a kappa value of 0.84). Applicants selected 8161 queries and human annotated those queries based on an annotation specification. Under a ratio of 3:1, applicants randomly split this data set into two sets, which resulted in 6120 queries in a training set and 2041 queries in a testing set. A derived CRF parser was tested on the training set and both a derived FSM parser and the derived CRF parser were tested on the testing set. Table 3 and Table 4, respectively, present evaluation results at the token level and entity level for the derived FSM parser and the derived CRF parser.

TABLE 3

| FSM | Prec. | Rec. | F1 |
| --- | --- | --- | --- |
| Token Level | 0.7372 | 0.5573 | 0.6347 |
| Entity Level | 0.5412 | 0.5578 | 0.5494 |

TABLE 4

| CRF | Prec. | Rec. | F1 |
| --- | --- | --- | --- |
| Token Level | 0.9313 | 0.9398 | 0.9356 |
| Entity Level | 0.8851 | 0.8661 | 0.8755 |

For the derived FSM parser, if the parser generates more than one result, greedy heuristics can be utilized to take the longest candidate. For the AOL testing set, the derived CRF parser performed significantly better than the derived FSM parser. Since the training and testing data are from the same source, the improvement of employing high-level language model features is not very significant (less than 1% in terms of F1).

Having learned the derived CRF parser using the AOL labeled data, applicants considered how it could be generalized on other query data sets. A synthetic data set was generated by extracting query templates from the previous AOL training set and inserting class-based query logs into the pattern set based on the distribution. This synthetic query set included 5000 queries. The query parser derivation computing device 102 was tested on the 5000 queries using models learned from the previous AOL data set and the roles of different features for the CRF-based approach were investigated. The query parser derivation computing device 102 performance using the different feature combination is shown in Table 5.

Table 5 shows the experimental results evaluated at the token level for various feature combinations. As more class-based language models were added into the query parser derivation computing device 102, performance of a derived parser kept improving. From Table 5 it can be seen that the high-level language models can improve the F1 scores from 0.9500 to 0.9735. The query parser derivation computing device 102 provides a query parser that performs better and coverage is significantly improved. With regard to the system/method having an F1 over 0.90, mostly applicants took top queries from the query logs when generating the synthetic data set. If more tail queries are added with more consequent noise, it can be expected that the high-level language models can help more than in currently tested examples.

TABLE 5

| Features | Prec. | Rec. | F1 |
| --- | --- | --- | --- |
| window word | 0.9234 | 0.9393 | 0.9313 |
| +surface word | 0.9436 | 0.9565 | 0.9500 |
| +topic ngrams | 0.9539 | 0.9664 | 0.9601 |
| +geo ngrams | 0.9678 | 0.9793 | 0.9735 |

It will be understood by those skilled in the art that the disclosed subject matter builds rule-based and statistical parsers. For the FSM query parser derivation computing device 102, a CFG composition was utilized to build phrase-level grammars. For the query parser derivation computing device 102 derived CRF parser, state transition features were learned from a small labeled set and high-level n-gram language models were extracted to help generalize the parser and improve its coverage. While acquisition of labeled data is a major bottleneck in most supervised learning problems, applicants have demonstrated a query parser derivation computing device 102 and method of the disclosed subject matter that can work through the data problem by leveraging large scale but noisy class-based query logs. The query parsing schema can be applied to support more complex queries, such as "late night bars in San Francisco" and "cheap hotels with free wifi". User behavior data, for example, click-through data may also be utilized to disambiguate parsing results when multiple interpretations are possible.

A data-driven approach to a query parser derivation computing device 102 has been built using conditional random field (CRF) models. Class transition features were learned by the query parser derivation computing device 102 from a labeled set and high-level language models were extracted as state features. The query parser derivation computing device 102 can learn language models from large-scale class-based logs to obtain high coverage on unknown queries.

It will also be understood by those skilled in the art that the present application discloses a system/method whereby a data-driven approach has been used to learn a query parser for local-search (geographical) unstructured queries. The learned model uses class-level n-gram language model-based feature models, which feature models, harvested from structured queries logs, insulate the model from surface-level tokens.

It will be understood that the above disclosed subject matter may be useful for providing local search applications/services (including business, product and utility searches), e.g., with a focus on social media analysis or real-time searches (such as Twitter® or Facebook®, such as for mining text data. Others, e.g., shifting from form-filing-based search/query to more advanced natural (natural language or speech) search/query can benefit from the disclosed subject matter, e.g., in order to utilize their log data for building intelligent systems, such as to support advanced human computer interaction.

It will be understood by those skilled in the art that a system and method has been disclosed for deriving a query parser for parsing an unstructured geographic web-search query into a field-based format, by utilizing conditional random fields, learned by semi-supervised automated learning, to parse structured information from the unstructured geographic web-search query. The system and method may comprise establishing semi-supervised conditional random fields utilizing one of a rule-based finite state machine model and a statistics-based conditional random field model, utilizing systematic geographic parsing with the one of the rule-based finite state machine model and the statistics-based conditional random field model.

The system and method may also comprise utilizing in the rule based finite state machine model a phrase level grammar to construct a phrase level grammar composition to form the query parser. The system and method disclosed may comprise utilizing in the statistics-based conditional random fields model class transition features learned from a labeled set of features and extracting at least one high-level language model as a state feature, thereby allowing at least one learned language model to be learned from at least one large-scale class-based log to improve coverage on an unknown query and parsing an unstructured local geographical web-based query in local domain by deriving a learned model parser to parse the query.

The derived learned model parser may use at least one class-based query log from a form-based query system. The derived learned model parser may comprise at least one class-level n-gram language model-based feature harvested from a structured query log, which may be a class-based log from a form-based query system.

The system and method may comprise a derived learned model parser which may comprise a learning statistical conditional random field parser. The conditional random field parser may perform at least one of segmenting and labeling query sequence data.

Semi-supervised conditional random fields may be established utilizing a linear-chain Markov random fields model. This system and method may comprise processing an input query as a sequence of individual tokens Q=(t1, t2 . . . , tn), with a corresponding labeling sequence of labels for each token (t1, t2, . . . tn), L=(l1, l2, . . . , ln), wherein each label is defined as a respective sentence, including a sentence from the list search terms ("TopicEx"), geographic terms ("GeoEx"), geographic relation ("GeoRel"), and unnecessary information ("O") and finding the most probable labeling sequence L for the input query Q. For each label in L, $$L = \underset{L}{\mathrm{argmax}} P(L|Q).$$

The query parser derivation computing device and method may comprise characterizing a conditional random field model of Q and L as a set of feature functions fk, each having a corresponding weight λk and computing the conditional probability P(L|Q) according to:

$$P(L|Q) = \frac{1}{Z_S} \exp\left(\sum_{t=1}^{T} \sum_{k} \lambda_k * f_k(l_{t-1}, l_t, Q, t)\right)$$

where $f_k (L_{t-1}, l_t, Q, t)$ is a feature function, representing one of a state transition feature, including $f_k (l_{t-1}, l_t, Q)$ and an output state feature, including $f_k (l_t, Q)$ for a given input sequence; and utilizing the query parser derivation computing device to train at least one of the state transition feature and the output state feature based upon a labeled set. The state transition feature $f_k (l_{t-1}, l_t, Q, t)$ may be learned, limited by learning features of the output state $f_k (l_t, Q)$.

The apparatus and method may comprise examining a token to determine whether the token appears as the ith word in an n-gram, where n includes at least 1, 2 and 3, learned from geographic terms, and, if so, assigning the token a feature GEO_Nth_ith; examining a token to determine whether the token appears as the ith word in an n-gram, where n includes at least 1, 2 and 3, learned from search terms, and, if so, assigning the token a feature ST_Nth_ith; wherein the feature terms Nth are accordingly selected from the set of at least UNI, BI and TRI and the ith terms are accordingly selected from the set of at least FIRST, SECOND and THIRD; more particularly, e.g., class-based language model features comprising at least one token appearing in a defined position in a feature comprising a grouping of tokens of a given length, including GEO_UNI_FIRST, for the first token in a grouping of tokens of length one, relating to a geographic term, GEO_BI_FIRST, for the first token in a grouping of tokens of length two relating to a geographic term, GEO_BI_SECOND, for the second token in a grouping of tokens of length two relating to geographic term, GEO_TRI_FIRST, for the first token in a grouping of tokens of length three relating to a geographic term, GEO_TRI_SECOND, for the second token in a grouping of tokens of length three relating to a geographic term, GEO_TRI_THIRD, for the third token in a grouping of tokens of length three relating to geographic terms, and ST_UNI_FIRST, ST_BI_FIRST, ST_BI_SECOND, ST_TRI_FIRST, ST_TRI_SECOND and ST_TRI_THIRD, for tokens relating to search terms, for any grouping of length n where n is an integer, and utilizing the features as high-level language model features to parse the input unstructured geographic web-search query. Parsing the input query may recognize both a geographic location token and a search term token. Phrase level grammar may be built using a context free grammar composition.

As used in this application the term "a computing device," such as may form a part of a system or be utilized to perform method steps as part of a method, according to aspects of embodiments of the disclosed subject matter for a system and method for deriving a query parser for parsing an unstructured search query using a learned query parser learning from structured query logs, by way of example, may comprise a computer processor or other processor unit capable of obtaining and executing instructions, such as application and operating system software instructions. The processor may be any form of hardware device for executing software instructions which may be stored in and obtained from a storage medium, such as cache memory, main memory, local disc storage and remote disc storage and may reside in different ones of such types of storage media at different times.

The processor may be any custom made or commercially available processor, a central processing unit (CPU), an auxiliary processor among several processors associated with the processing unit, a semiconductor based microprocessor (in the form of a microchip or chip set), a macro-processor, a microcontroller, an array of processors, a networked group or array of computing devices or generally any device for executing software instructions. The processor may comprise a controller, microcontroller, or a hard wired, including firmware, device, or any combination thereof, or any other processor capable of performing logic driven operations, under partly or fully programmable instructions.

Software operating on the processor may include one or more separate programs, each of which comprises an ordered listing of executable instructions for implementing logical functions. Software may be in the form of application software and operating system software which is stored in a tangible medium, such as any of the storage media (memories) noted above. The operating system essentially controls the execution of other computer programs by the computing device. Software may be written and compiled as (a) an object oriented programming language, which has classes of data and methods, or (b) a procedure programming language, which has routines, subroutines, and/or functions, such as C, C++, Pascal, Basic, Fortran, Cobol, Perl, Java, and Ada or standard Internet languages, such as XML or HTML.

In the context of this disclosure, a tangible computer readable medium may be any electronic, magnetic, optical, or other physical device or means that can contain or store data or a computer program(s) for use by or in connection with a computing device related system or method. The tangible computer readable medium can be, for example, but not limited to, an electronic, magnetic, optical, electromagnetic, infrared, or semiconductor system, apparatus, device, or other non-transitory propagation medium, including, by way of example an electrical connection (electronic) having one or more wires, a portable computer diskette (magnetic), a random access memory (RAM) (electronic), a read-only memory (ROM) (electronic), an erasable programmable read-only memory (EPROM), an electronically erasable programmable read-only memory (EEPROM), a Flash memory (electronic), an optical fiber memory (optical), a portable compact disc read-only memory (CDROM) (optical), a tape (magnetic), a large disc storage medium (magnetic), etc.

For the purposes of this disclosure a module is a software, hardware, or firmware (or combinations thereof) system, process or functionality, or component thereof, that performs or facilitates the processes, features, and/or functions described herein (with or without human interaction or augmentation) as described here to be performed by a module. A module can include sub-modules. Software components of a module may be stored on one or more computer readable medium. Modules may be integral to one or more servers, or be loaded and executed by one or more servers. One or more modules may be grouped into an engine or an application.

The presently disclosed subject matter is described below with reference to block diagrams and/or operational illustrations of methods and devices to perform methods according to aspects of an embodiment of the disclosed subject matter (collectively "block diagram"). It is understood that each block of the block diagram can be implemented by means of analog or digital hardware and computer program instructions, such as on a computing device. In some alternate implementations, the functions/acts noted in the blocks or steps can occur out of the order noted in the block diagram. For example, two blocks shown in succession can in fact be executed substantially concurrently, on the same processor or on different processors in parallel or the blocks can sometimes be executed in the reverse order, depending upon the functionality/acts involved.

For the purposes of this disclosure the term "server" will be understood to refer to a service point which provides processing, database, and communication facilities. By way of example, and not limitation, the term "server" can refer to a single physical processor with associated communications and data storage and database facilities, or it can refer to a networked or clustered complex of processors and associated network and storage devices, as well as operating software and one or more database systems and applications software which support the services provided by the server, all of which may be also referred to as a computing device or a communication device as may be consistent with the context of the system and method being described or claimed.

Depending upon the context in which described or claimed a communication device may be more than one physical device operating to carry out the communication function described, such as any one of a number of hand held portable communications devices such as a cellular phone, Blackberry, iPod, Droid, and the like, or groups thereof, interconnected to communications network stations and facilities, such as the cellular phone base stations, the Internet, the public switched network, etc., any or all acting in series or in parallel or combinations thereof, with associated transmitting and receiving equipment, coding and decoding equipment, modulating and demodulating equipment, computing devices, data bases and the like equipment, necessary for and capable of, carrying out the disclosed or claimed communication referenced in the present application.

It should be understood that the embodiments described herein are merely exemplary and that a person skilled in the art may make many variations and modifications without departing from the spirit and scope of the invention. All such variations and modifications are intended to be included within the scope of the invention.

What is claimed is:

1. A method comprising:
   deriving, via a query parser derivation computing device, a query parser for parsing an unstructured geographic web-search query into a field-based format, the deriving of the query parser comprising:
      receiving an input query, wherein the input query comprises a series of tokens;
      assigning a label to each of a plurality of the tokens;
      calculating the most probable label sequence for the input query;
      assigning one or more sentences from a plurality of sentences to each label based at least in part on the most probable label sequence for the input query, wherein:
         the one or more sentences are different from the labels; and
         the one or more sentences are assigned so that the respective sentence identifies the respective label as corresponding to one or more of a search term, a geographic expression, a geographic expression relation indication, and/or uninteresting information;
      creating a conditional random field model based at least in part on i) the tokens, ii) the labels, iii) characterizing a set of one or more feature functions, wherein:
         the set of one or more feature functions represent a state transition feature and/or one or more features of an output state for an input sequence; and
         a conditional probability is computed based in part on the set of one or more feature functions;
      training the one or more state transition features and the one or more output state features on a labeled set, wherein learning the state transition feature is limited on learning the one or more features of the output state; and
   utilizing, by the query parser, conditional random fields, learned by semi-supervised automated learning and based at least in part on the training, to produce structured information from the unstructured geographic web-search query, wherein the utilizing the conditional random fields to produce the structured information comprises:

parsing the unstructured geographic web-search query to produce the structured information from the unstructured geographic web-search query;

determining that the parsing the unstructured geographic web-search query results in a multiple interpretation condition, where the parsing identifies at least a first interpretation of the unstructured geographic web-search query corresponding to first parsing results and a second interpretation of the unstructured geographic web-search query corresponding to second parsing results; and based at least in part on user behavior data, disambiguate the first parsing results and the second parsing results to select the first parsing results corresponding to the first interpretation of the unstructured geographic web-search query.

2. The method of claim 1, further comprising:

defining, via the query parser derivation computing device, class-based language model features comprising at least one token appearing in a defined position in a model feature comprising a grouping of tokens of a given length n, where n is an integer, including GEO_UNI_FIRST, for the first token in a grouping of tokens of length one, relating to a geographic term, GEO_BI_FIRST, for the first token in a grouping of tokens of length two relating to a geographic term, GEO_BI_SECOND, for the second token in a grouping of tokens of length two relating to a geographic term, GEO_TRI_FIRST, for the first token in a grouping of tokens of length three relating to a geographic term, GEO_TRI_SECOND, for the second token in a grouping of tokens of length three relating to a geographic term, GEO_TRI_THIRD, for the third token in a grouping of tokens of length three relating to a geographic term, and including ST_UNI_FIRST, for the first token in a grouping of tokens of length one, relating to a search term, ST_BI_FIRST, for the first token in a grouping of tokens of length two relating to a search term, ST_BI_SECOND, for the second token in a grouping of tokens of length two relating to a search term, ST_TRI_FIRST, for the first token in a grouping of tokens of length three relating to a search term, ST_TRI_SECOND, for the second token in a grouping of tokens of length three relating to a search term, ST_TRI_THIRD, for the third token in a grouping of tokens of length three relating to a search term, for tokens relating to one of a geographic term and a search term, for any grouping of length n where n is an integer; and utilizing, via the query parser derivation computing device, the class-based language model features as high-level language model features in deriving the query parser.

3. The method of claim 2, wherein the query parser recognizes both a geographic location token and a search term token in an input query.

4. The method of claim 1, further comprising:

establishing the semi-supervised conditional random fields via one of a rule-based finite state machine model and a statistics-based conditional random field model.

5. The method of claim 4, wherein the semi-supervised conditional random fields are established via utilizing systematic geographic parsing with the one of the rule-based finite state machine model and the statistics-based conditional random field model.

6. The method of claim 4, wherein the statistics-based conditional random field model is utilized with class transition features learned from a labeled set of features and extracting at least one high-level language model as a state feature, thereby allowing at least one learned language model to be learned from at least one large-scale class-based log.

7. The method of claim 4, wherein the rule based finite state machine model is utilized with a phrase level grammar to construct a phrase level grammar composition.

8. The method of claim 7, further comprising:

constructing the phrase level grammar, via the query parser derivation computing device, using a context free grammar composition.

9. The method of claim 4, wherein the semi-supervised conditional random fields are utilized in a linear-chain Markov random field model.

10. The method of claim 1, wherein for each label in $$L = \underset{L}{\operatorname{argmax}} P(L|Q).$$

11. The method of claim 10, wherein the creating the conditional random field model comprises:

characterizing, via the query parser derivation computing device, a conditional random field model of Q and L as a set of feature functions fk, each having a corresponding weight λk and computing via the query parser derivation computing device, the conditional probability $$P(L|Q) = \frac{1}{Z_S} \exp\left(\sum_{t=1}^{T} \sum_{k} \lambda_k * f_k(l_{t-1}, l_t, Q, t)\right)$$

where fk (lt−1, lt, Q, t) is a feature function, representing one of a state transition feature, including fk (lt−1, lt, Q), and an output state feature, including fk (lt, Q), for a given input sequence.

12. A method comprising:

deriving a query parser, via a query parser derivation computing device, the deriving of the query parser comprising:

receiving an input query, wherein the input query comprises a series of tokens;

assigning a label to each of a plurality of the tokens;

calculating the most probable label sequence for the input query;

assigning one or more sentences from a plurality of sentences to each label based at least in part on the most probable label sequence for the input query, wherein:

the one or more sentences are different from the labels; and the one or more sentences are assigned so that the respective sentence identifies the respective label as corresponding to one or more of a search term, a geographic expression, a geographic expression relation indication, and/or uninteresting information;

creating a conditional random field model based at least in part on i) the tokens, ii) the labels, iii) characterizing a set of one or more feature functions, wherein:

the set of one or more feature functions represent a state transition feature and/or one or more features of an output state for an input sequence; and a conditional probability is computed based in part on the set of one or more feature functions;

training the one or more state transition features and the one or more output state features on a labeled set, wherein learning the state transition feature is limited on learning the one or more features of the output state; and utilizing an unstructured local geographical web-based query in local domain by applying a learned model parser, which is based at least in part on the training, to the query, wherein the utilizing the conditional random fields to produce the structured information comprises:

parsing the unstructured geographic web-search query to produce the structured information from the unstructured geographic web-search query;

determining that the parsing the unstructured geographic web-search query results in a multiple interpretation condition, where the parsing identifies at least a first interpretation of the unstructured geographic web-search query corresponding to first parsing results and a second interpretation of the unstructured geographic web-search query corresponding to second parsing results; and based at least in part on user behavior data, disambiguate the first parsing results and the second parsing results to select the first parsing results corresponding to the first interpretation of the unstructured geographic web-search query.

13. The method of claim 12, wherein the learned model parser uses at least one class-based query log from a form-based query system.

14. The method of claim 13, wherein the learned model parser comprises at least one class-level multi-token language model-based feature harvested from a structured query log.

15. The method of claim 14, wherein the structured query log comprises a class-based log from a form-based query system.

16. The method of claim 12, wherein the learned model parser comprises a learning statistical conditional random field parser.

17. The method of claim 16, wherein the learning statistical conditional random field parser performs at least one of segmenting and labeling query sequence data.

18. One or more non-transitory, machine-readable media having machine-readable instructions thereon, which instructions, when executed by one or more computing devices, cause the one or more computing devices to:

derive a query parser for parsing an unstructured geographic web-search query into a field-based format, the deriving of the query parser comprising:

receiving an input query, wherein the input query comprises a series of tokens;

assigning a label to each of a plurality of the tokens;

calculating the most probable label sequence for the input query;

assigning one or more sentences from a plurality of sentences to each label based at least in part on the most probable label sequence for the input query, wherein:

the one or more sentences are different from the labels; and the one or more sentences are assigned so that the respective sentence identifies the respective label as corresponding to one or more of a search term, a geographic expression, a geographic expression relation indication, and/or uninteresting information;

creating a conditional random field model based at least in part on i) the tokens, ii) the labels, iii) characterizing a set of one or more feature functions, wherein:

the set of one or more feature functions represent a state transition feature and/or one or more features of an output state for an input sequence; and a conditional probability is computed based in part on the set of one or more feature functions;

training the one or more state transition features and the one or more output state features on a labeled set, wherein learning the state transition feature is limited on learning the one or more features of the output state; and utilize conditional random fields, learned by semi-supervised automated learning and based at least in part on the training, to produce structured information from the unstructured geographic web-search query, wherein the utilizing the conditional random fields to produce the structured information comprises:

parsing the unstructured geographic web-search query to produce the structured information from the unstructured geographic web-search query;

determining that the parsing the unstructured geographic web-search query results in a multiple interpretation condition, where the parsing identifies at least a first interpretation of the unstructured geographic web-search query corresponding to first parsing results and a second interpretation of the unstructured geographic web-search query corresponding to second parsing results; and based at least in part on user behavior data, disambiguate the first parsing results and the second parsing results to select the first parsing results corresponding to the first interpretation of the unstructured geographic web-search query.

* * * * *